Oct. 6, 1959 G. W. ANSELMAN ET AL Re. 24,716

AIR FLOW CONVEYING SYSTEM

Original Filed Oct. 31, 1955 2 Sheets-Sheet 1

Inventors:
George W. Anselman and
Gilbert A. Babcock
By: Vernon C. Berdine
Atty.

AIR FLOW CONVEYING SYSTEM

Original Filed Oct. 31, 1955 2 Sheets-Sheet 2

Inventors:
George W. Anselman
and Gilbert A. Babcock
By: Vernon C. Berdine
Atty.

United States Patent Office

Re. 24,716
Reissued Oct. 6, 1959

24,716

AIR FLOW CONVEYING SYSTEM

George W. Anselman, Elgin, and Gilbert A. Babcock, Franklin Park, Ill., assignors to Whirl-Air-Flow Corporation, a corporation of Illinois Original No. 2,794,686, dated June 4, 1957, Serial No. 543,875, October 31, 1955. Application for reissue May 11, 1959, Serial No. 812,571

6 Claims. (Cl. 302—24)

Matter enclosed in heavy brackets [ ] appears in the original patent but forms no part of this reissue specification; matter printed in italics indicates the additions made by reissue.

This invention relates to air flow conveying system more particularly for transportation through piping of granular or otherwise discrete and particulate material, which, in one instance, as here particularly referred to, may be foundry sand for the making of sand molds or cores.

The transporting by air pipes of pneumatic tubes of cash cylinders in department stores, for example, is well known and it is also known that granular or discrete material such as foundry sand, gravel and concrete mixes, and the like may be somewhat similarly conveyed from a place where they are prepared or mixed to another place, perhaps some distance away, where the material is put to use. A serious problem, however, which has heretofore been encountered in such pneumatic or air conveying systems for material such as sand has been the high rate of abrasion of the interior surface of the pipes and the tendency of the pipes to become clogged with the material being transported.

An important object of the present invention is the provision of a conveying system of the class referred to in which wear on the pipes is substantially minimized and clogging is prevented while at the same time a more rapid and constant flow of material is insured, whereby maintenance and operational costs are reduced and delays due to replacement or clearing out of the pipes are substantially eliminated.

In accordance with the present invention, the air current in the conveyor pipe is given a spiral motion so that the path defined by a current of air through the pipe takes the form of a helix adjacent the inner periphery of the pipe, thus causing the air, in addition to providing a forwardly moving medium or vehicle in which the material particles or the like are entrained, to provide an air buffer or cushion that inhibits or minimizes contact of the material with the inside of the pipe and at the same time keeps the material stirred up and in suspension in the air current so as to maintain aeration and prevent depositing of the material along the lower areas of the pipe.

Following the present invention, air jets are provided that are directed both forwardly and circumferentially with respect to the pipe and, in the preferred form of the invention here disclosed, such angled jet arrangement is provided not only in the initial stage of the conveying system but also at intermediate points therealong whereby to provide spiral air boosters. In the initial stage, preferably, such jets are adjustable.

The invention contemplates both method and apparatus.

The foregoing and other objects and advantages will be apparent from the following description, taken together with the accompanying drawings, showing an illustrative embodiment of the invention, and in which drawings—

Figure 1:
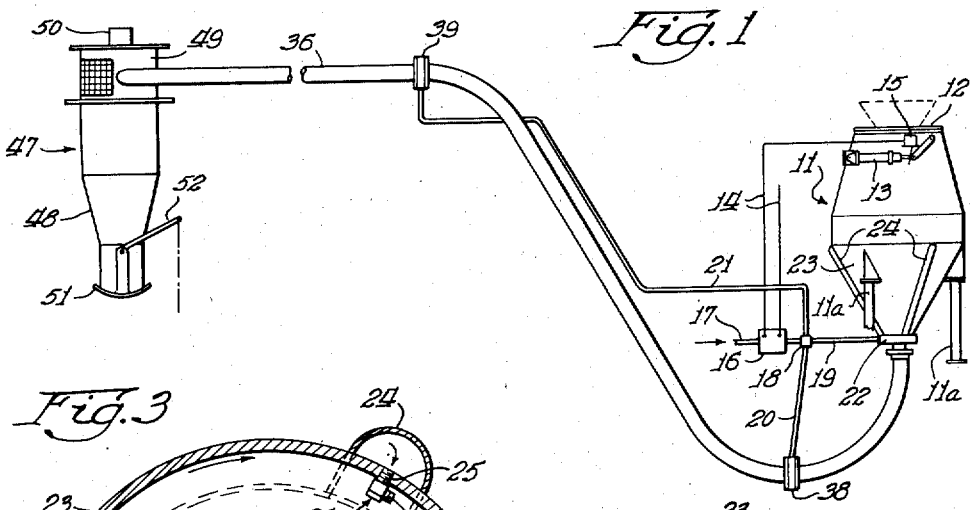
Figure 1 is a general view, somewhat diagrammatic, of an air flow conveying system incorporating the present invention.

Referring in detail to the illustrative construction shown in the drawings, the transporter or charging hopper 11 is adapted to receive prepared and conditioned sand from a sand muller or other mixing means and prepared for use, for example, for the making of sand molds or cores in metal foundries. The hopper 11 is provided at its upper end with a closure 12 which may be operable by a pneumatic jack 13 by auxiliary means which need not be here described. The jack may be in control of an electric circuit including the wires 14, through a switch 15, and actuates or deenergizes a solenoid valve 16 that is in control of a supply of air under pressure available at the air line 17. When the closure 12 is open for purposes of charging the hopper 11 with sand from the mill, the solenoid valve 16 is deenergized and the valve mechanism thereof closed. When the gate 12 is closed, after the sand has been deposited, the solenoid valve 16 is energized and the valve mechanism thereof opened to admit air under pressure to the universal coupling 18 from which air is distributed equally to the three branch air lines 19, 20 and 21. The line 19 carries the air to a header 22 that encircles the lower conical end 23 of the hopper 11. The header 22 is in communication with the plurality of, and in this instance three, air manifolds 24 which lie along the exterior of the conical part 23 of the hopper 11, circumferentially spaced therealong, and diverging, with the hopper, upwardly from the header 22. 11a are legs for the hopper.

Figure 8:
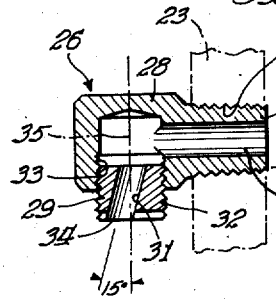
Figure 8 is an axial section of the fitting of Fig. 7.
Figure 7:
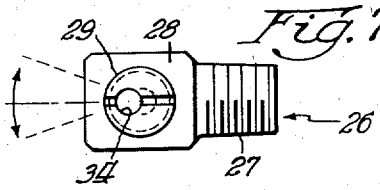
Figure 7 is a view of one of the jet fittings shown in Figs. 1, 2, 3 and 4.
Figure 4:
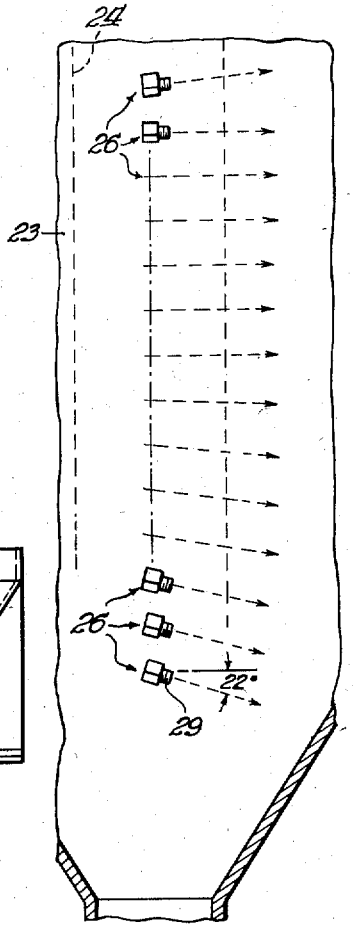
Figure 4 is an enlarged vertical section on the line 4—4 of Fig. 2.
Figure 2:
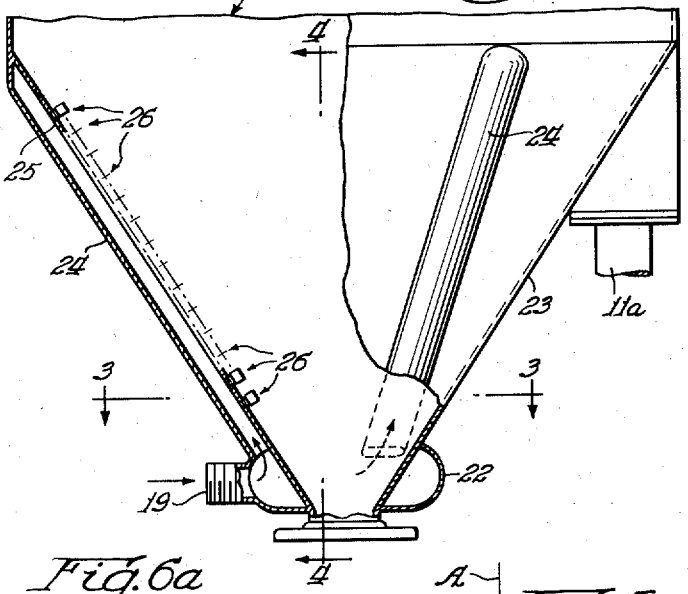
Figure 2 is a fragmentary view showing the lower end of the charger hopper or transporter shown in Fig. 1, on a somewhat larger scale, Fig. 2 being partially in section and being broken away for clearness of description.

In accordance with the present invention, interiorly of the inverted conical portion 23 of the hopper 11, the walls thereof are perforated by tapped holes 25 along conically diverging lines registering with the manifolds 24 respectively. As best seen in Fig. 4, there are here shown fourteen such aligned holes for one of the manifolds and in each of said perforations 25 there is screwed a jet fitting 26, which as best seen in Figs. 7 and 8, has a threaded shank 27 that is screwed into the tapped aperture 25 and a head 28 projecting into the interior of the hopper 11. The head 28 is provided with a jet nozzle 29 extending at right angles to the head 28. The bore 30 of the shank 27 is in communication through the head 28 with the bore 31 of the jet nozzle 29, the latter bore 31 being angularly located in the jet nozzle 29 so that, by rotation of the nozzle 29 in the head 28, which is made possible by the threaded exterior 32 of the jet nozzle screwing into the tapped mouth 33 of the head, the jet nozzle may be rotated so as to cause the mouth 34 of the jet to have a possible 360° movement around the center line 35 passing transversely through the head and axially through the jet nozzle. The degree of slant or angulation of the bore 31 of the jet from the center line 35 is in this instance 15°. The jet fitting 26 is thus adjustable in two directions, first, by means of the screw connection 27, in a plane parallel to a plane tangent to the wall of the hopper, and, second, in another plane transverse to the plane of tangency by means of the screw connection 32 and the slanting bore 31 of the jet nozzle 29.

Figure 3:
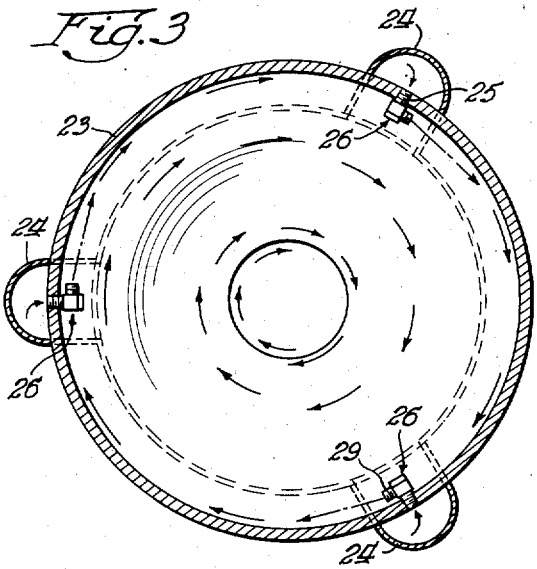
Figure 3 is a further enlarged cross section taken on the line 3—3 of Fig. 2.
Figure 9:
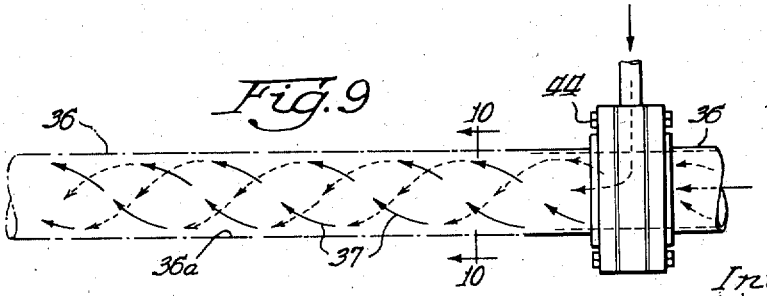
Figure 9 is a phantomized view of a portion of pipe and one of the air boosters, diagrammatically showing the helical path of the air through the pipe.

It will be understood that air under pressure from the header 22 passes through each of the manifolds 24 and from the latter through the apertures 25 and the jet fittings 26. By adjusting the fittings in one or both of the ways already described, the air entering the hopper, as best seen in Fig. 3, may be directed either in a horizontal plane or in planes tilted either upwardly or downwardly from the horizontal. As best seen in Fig. 4, for example, of the fourteen jets of a row, the upper one is here shown directed upwardly, the intermediate jets are shown directed horizontally, and the lower jets of the row are shown directed downwardly. The jet which is directed upwardly at the upper end of the row serves the purpose of keeping the sand stirred up in the hopper so as to facilitate its free movement and aeration therein. The jets directed horizontally serve the purpose of creating a swirling action which begins to direct the sand in a spiral path, and the jets directed downwardly, at the lower end of the row, serve to cause this spiral path to take the form of a helix, as it moves out through the lower end of the hopper and into the delivery pipe 36. There the air maintains this helical spiral path as best seen in Fig. 9.

Figure 10:
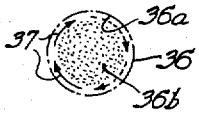
Figure 10 is a somewhat diagrammatic cross-section of Fig. 9, further showing the helical path of the air and the concentration of the sand away from the inner periphery of the pipe.

As indicated in Fig. 10, the air denoted by the arrows 37 forms a buffer between the inner periphery 38 of the pipe 36 and the mass of sand 39 moving therethrough under the force of and entrained with the air. As at present advised, an explanation of the reason for this may well be that the velocity of the air immediately adjacent the inner periphery 38 of the pipe 36 is reduced somewhat by friction, thereby increasing the pressure at the periphery with a consequent differential of pressure drop toward the area adjacent the axis of the pipe, the sand taking the path of least resistance being thus caused to travel generally adjacent the axis of the pipe with the advantageous result that contact of the sand with the inner periphery of the pipe is minimized and abrasion and wear on the pipe is inhibited or at least markedly reduced.

It will be best seen from Fig. 3 that the jet fittings 26 are uniformly arranged to cause the air to travel in a clockwise spiral. The angular adjustments for the jet fittings already described are thus in a direction both forwardly and circumferentially of the pipe, harmonizing with the helical spiral path previously described.

Further in accordance with the present invention, in order to compensate for air loss and maintain the forward helical path for the air, as here referred to, throughout the length of the delivery pipe 36, which may be quite long, in some cases several hundred feet or more, it is desirable to provide, as here shown, air booster means so that there are a plurality of means creating a helical path for the air, spaced apart along the pipe. As indicated in Figure 1, two of such air booster means are shown indicated at 38 and 39. These air booster means are advantageously at places where there is a turn or bend in the pipe 36 or just after the turn.

Figure 6:
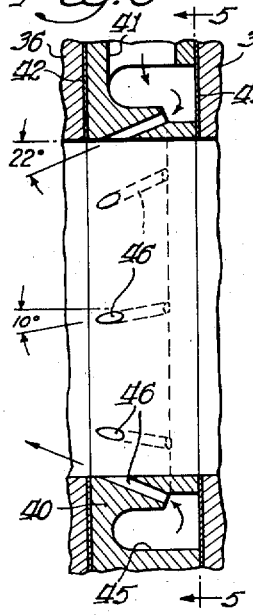
Figure 6 is a diametrical section taken on the line 6—6 of Fig. 5.
Figure 5:
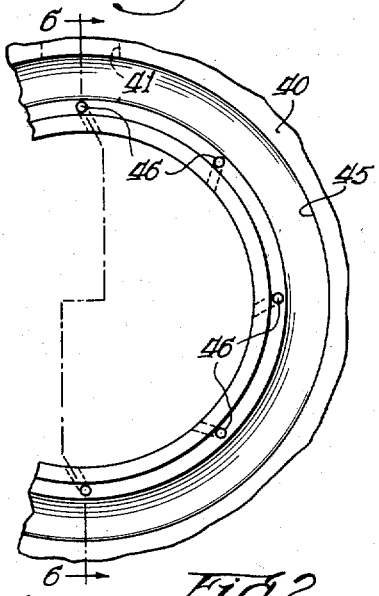
Figure 5 is a front elevational view, broken away to save space, of an air booster ring, two of which are shown spaced along the pipe in Fig. 1.

The air line 20 already referred to extends from the universal 18 to the air booster 38 and the air line 21 from the universal 18 to the air booster 39. Each of these air boosters 38 and 39 may comprise a hollow ring 40 (see Figs. 5 and 6) into which the air line 20 or 21 as the case may be, leads as at 41. The ring 40 is interposed in the pipe 36 between sections thereof as indicated in Fig. 6, gaskets 42 and 43 facing the ring on each side. Flanged couplings on the pipe ends may be clamped together and to the booster ring as by bolts 44 (Fig. 9).

The booster ring 40 is hollow as by having the annular chamber 45 therein, from which chamber are directed the jet apertures 46 spaced circumferentially about the ring 40, there being in this instance eight such apertures. Each of these jet apertures 46 is directed so as to maintain the clockwise direction of air through the pipe 36 and is directed both circumferentially and forwardly. In this instance, the degree of inclination, from the axis of the pipe, for the forward direction of the jet aperture is 22°, while the degree of inclination from the axis of the pipe for the circumferential direction of the orifice, is 10°. Thus both a circumferential and a forward boosting action is given to the air by the booster ring 40 and this action of the booster rings is such as to regenerate or boost the spiral helical action given to the air initially by the jets 26 in the charging hopper 11.

Figure 6A:
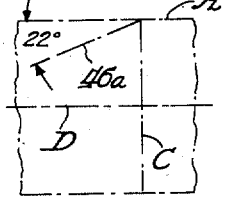
Figure 6a is another diagrammatic view corresponding somewhat to Fig. 6.
Figure 5A:
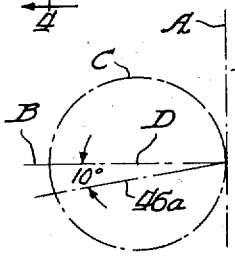
Figure 5a is a diagrammatic view corresponding somewhat to Fig. 5.

Reverting to Figs. 5a and 6a, the plane of tangency previously referred to is indicated at A, while a plane normal to the plane of tangency is indicated at B. C may represent the circular line of the jet apertures 46 which coincides in general with the internal periphery of the delivery pipe 36. D is the axis of the ring which also corresponds to the axis of the pipe. It will be understood that the diagrammatic views of Fig. 5a and Fig. 6a are rotated ninety degrees one with respect to the other both with respect to the line B and also with respect to the line A, that is, in a plane coinciding with the axis and in a plane coinciding with the diameter. By this dual rotation of the views of Figs. 5a and 6a it will be seen that 46a represents diagrammatically the line of direction of one and the same jet aperture 46 showing its two components of direction, and the same is true of each jet aperture 46.

Figs. 5a and 6a illustrate the inclination of each jet aperture at a 10° angle to a plane B normal to the plane of tangency A (which may be said to be in a direction centrifugally of the pipe) and at an angle of 22° from the plane of tangency A (which may be said to be in a direction forwardly of the pipe). Similarly with respect to the jet fitting 26, the angle of these fittings shown in the lower end of Fig. 4 corresponds to an angle from a plane normal to the plane of tangency (as in Fig. 5a) while the angle of the jet orifice 34 shown in Fig. 8 corresponds to the angle from the plane of tangency (as in 6a), although the degree of angle may vary.

In each case, that is with respect to the jet fittings 26 and the jet apertures 46 the inclination is such as to give a direction having both a forward component and a circumferential component to provide and maintain the spiral helical path for the air in the delivery pipe 36, for the purposes hereinabove referred to. By reason of the dual adjustability of the jet fitting, 26, such angles may be established as to effect an optimum of the desired result.

The air propelled sand is finally delivered to a receiver 47 which is in the nature of a receiving hopper cylindrical at its top and tapering at its lower end to form a delivery chute 48. As the sand and air under pressure enters the upper end 49 of the receiving hopper the air is dissipated through a vent 50 and the sand under the influence of gravity falls into the delivery chute 48. The latter at its lower end may be closed by a gate 51 that may be actuated by a lever 52 to open the gate and permit sand to fall from the delivery chute 48 into the flask or mold for the casting (not shown). The lever 52 may be actuated by a flexible lanyard that may be pulled down by the workman to deliver the sand.

Changes may be made as fall within the scope of the appended claims without departing from the invention.

What is here claimed is:

1. In an air flow conveying system for discrete material of the class described, a funnel-shaped charging hopper for the material, said hopper having at each of at least three points spaced substantially equidistant therearound a longitudinally extending manifold for air on the outer surface thereof, rows of longitudinally aligned perforations in the hopper wall registering with the manifolds respectively, an air jet fitting inserted in each perforation, each said fitting comprising a hollow externally threaded shank screwed into the perforation, a hollow head projecting from the shank into the hopper, and an externally threaded jet nozzle extending at right angles from the head and rotatably adjustable in internal threads in the head, said nozzle having a bore therethrough extending angularly to a center line passing transversely through the head and axially through the nozzle, a material delivery conduit in communication with the lower end of said hopper, an air booster interposed in said conduit, said booster comprising a hollow ring having inclined jet apertures therein communicating with the interior of the ring and with the pipe, said jet apertures being directed both circumferentially and forwardly in the direction of air flow, a cover for the upper end of the hopper, a source of air under pressure, said booster being in communication with said source, a header about the smaller end of the hopper in communication with the manifolds and with said source, and electrically actuated means causing closing of the cover to admit air from said source into both said header and said booster whereby to swirl the air in said hopper and to propel air under pressure in a helical path through said conduit.

2. The structure of claim 1 wherein some of the jet nozzles are directed in the opposite direction from the flow of the air in the conduit.

3. In an air flow conveying system for discrete material of the class described, a funnel-shaped charging hopper for the material, said hopper having at each of at least three points spaced substantially equidistant therearound a longitudinally extending manifold for air on the outer surface thereof, rows of longitudinally aligned perforations in the hopper wall registering with the manifolds respectively, an air jet fitting in each perforation, each said fitting comprising a hollow shank screwed into the perforation, a hollow head projecting from the shank into the hopper, and a jet nozzle extending at right angles from the head and rotatably adjustable in the head, said nozzle having a bore therethrough extending angularly to a center line passing transversely through the head and axially through the nozzle, a material delivery conduit in communication with the lower end of said hopper, a cover for the upper end of the hopper, a source of air under pressure, a header about the smaller end of the hopper in communication with the manifolds and with said source, and electrically actuated means causing closing of the cover to admit air from said source into said header whereby to propel air under pressure in a helical path through said conduit.

4. In an air flow conveying system for discrete material of the class described, a funnel-shaped charging hopper for the material, said hopper having longitudinally arranged perforations in the hopper wall, an air jet fitting in each perforation, each said fitting comprising a hollow shank screwed into the perforation, a hollow head projecting from the shank into the hopper, and a jet nozzle extending at right angles from the head and rotatably adjustable in the head, said nozzle having a bore therethrough extending angularly to a center line passing transversely through the head and axially through the nozzle, and a material delivery conduit in communication with the lower end of said hopper.

5. The structure of claim 4 wherein an air booster ring is interposed in the conduit spaced from the hopper, said ring having inclined circumferentially spaced jet apertures therein, said apertures being inclined more nearly in a direction axially forwardly than circumferentially of the conduit.

*6. In an air flow conveying system for discrete material, a generally funnel-shaped charging hopper for the material, a plurality of air jet fittings carried by the hopper in a plurality of longitudinally extended circumferentially spaced series of longitudinally spaced fittings, each series extending generally upwardly from adjacent the lower end of said hopper, each fitting having a jet outlet within the hopper opening outwardly adjacent to and generally parallel to the adjacent portion of the peripheral wall of the hopper, said fittings being adjustably connected to said hopper for rotational movement of said jet outlet about a generally horizontal axis generally radially disposed with respect to said hopper, a plurality of longitudinally extending manifolds for air connected to said hopper, one associated with each of said series of fittings and in communication with the air jet fittings thereof, and a source of air under pressure in communication with each of said manifolds.*

References Cited in the file of this patent or the original patent

UNITED STATES PATENTS

| | | |
|---|---|---|
| 640,463 | Gildea | Jan. 2, 1900 |
| 857,096 | McCord | June 18, 1907 |
| 960,023 | Knight | May 3, 1910 |
| 1,451,272 | Robinson | Apr. 10, 1923 |
| 1,566,536 | Hoving | Dec. 22, 1925 |
| 1,707,335 | Van Brunt | Apr. 2, 1929 |
| 1,746,395 | Herdemerten | Feb. 11, 1930 |
| 1,796,215 | Peikert | Mar. 10, 1931 |
| 1,819,346 | Tolman | Aug. 18, 1931 |
| 2,221,741 | Vogel-Jorgensen | Nov. 12, 1940 |
| 2,404,203 | Zimmerman | July 16, 1946 |
| 2,714,043 | Glaza | July 26, 1955 |